United States Patent

Arimura et al.

[11] 4,037,637
[45] July 26, 1977

[54] PNEUMATIC RADIAL TIRES

[75] Inventors: Iwao Arimura, Kodaira; Akio Sato, Higashi-Murayama; Hironori Hirano, Akigawa; Shigeo Makino, Tokorozawa, all of Japan

[73] Assignee: Bridgestone Tire Company Limited, Tokyo, Japan

[21] Appl. No.: 612,167

[22] Filed: Sept. 10, 1975

[30] Foreign Application Priority Data

Sept. 18, 1974 Japan .................. 49-106648

[51] Int. Cl.$^2$ ............................ B60C 9/04; B60C 9/18
[52] U.S. Cl. .................. 152/352 R; 152/354; 152/361 R
[58] Field of Search ............ 152/354, 361 R, 361 DM, 152/361 FP, 352

[56] References Cited

U.S. PATENT DOCUMENTS

| | | | |
|---|---|---|---|
| 3,643,723 | 2/1972 | Mukai et al. | 152/361 DM |
| 3,814,162 | 6/1974 | Hashida et al. | 152/361 DM |
| 3,896,869 | 7/1975 | Fujishima et al. | 152/361 DM |

Primary Examiner—Drayton E. Hoffman
Attorney, Agent, or Firm—Sughrue, Rothwell, Mion, Zinn and Macpeak

[57] ABSTRACT

A pneumatic radial tire so constructed as to reduce a breaker interlayer shearing strain without adding any particular supplemental reinforcing layer is disclosed. The radial tire has an initial sectional shape which satisfies the following conditions.

1. $R_1/R_{1'} \leq 0.8$
2. $R_2/W \,/\, R_{2'}/W' \geq 1.5$
3. Modulus of a breaker cord $\geq 10 \times 10^3$ Kg/mm$^2$, and
4. Breaker cord angle $\leq 25°$ where $R_1$ is a radius of curvature of an outer profile of a carcass in a vertical center section through a rotational axis of the tire on a normal line to an outer curved surface through a widthwise end of a crown before the inside of the tire is pressurized, $R_{1'}$ is its corresponding radius of curvature after the inside of the tire has been pressurized, $R_2$ is a radius of curvature of an outer profile of the crown in the vertical center section through the rotational axis of the tire before the inside of the tire is pressurized, $R_{2'}$ is its corresponding radius of curvature after the inside of the tire has been pressurized, W is the maximum width of the tire in the vertical center section through the rotational axis of the tire before the inside of the tire is pressurized, and W' is its corresponding maximum width of the tire after the inside of the tire has been pressurized.

13 Claims, 8 Drawing Figures

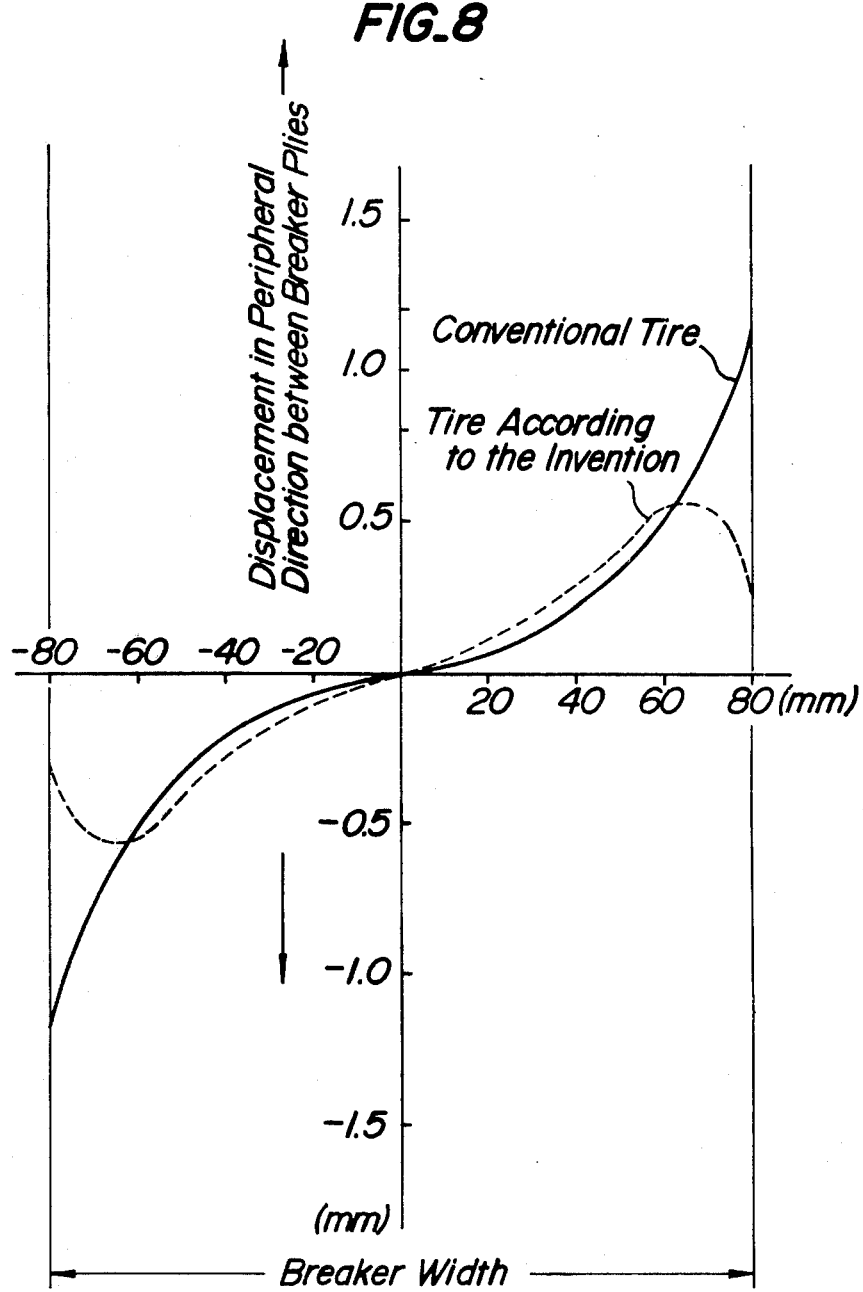

PNEUMATIC RADIAL TIRES

This invention relates to pneumatic radial tires and more particularly to a pneumatic radial tire so constructed as to reduce a breaker interlayer shearing strain.

In general, it has been the well known fact that the performance characteristics of a tire are substantially determined by its carcass shape.

A tire molded in a vulcanizing metal mold and used in practice must have such expanded deformed shape after the inside of the tire has been pressurized as to play a role inherent to the tire, that is, such shape as is initially desired in the case of design.

The idea that the stress produced in the tire body can be reduced by making the shape of the vulcanizing metal mold as near as possible to the shape of the tire after a normal internal pressure has been applied to the inside of the tire has heretofore been widely accepted in the tire field. As a method of designing such metal mold, it has been the common practice to use a method of proportionally allocating the dimensions of the tire to the metal mold or a calculation method based on Shell Theory known itself in which the tire is assumed as a thin film-shaped completely elastic body.

An important feature common to the above mentioned metal mold designing methods lies in the fact that the profile of the metal mold which extends from its tire crown portion and tread portion to bead portions thereof is substantially equal to the tire shape after the inside thereof has been pressurized.

FIG. 1 is a schematic sectional view of a left half of a conventional radial tire showing change in shape of the tire when it is disposed in a vulcanizing metal mold by a full line and after the inside thereof has been pressurized by dotted lines. Of course, left and right balance of practical tires are symmetrical with respect to the peripheral center lines $c$—$c$ of the tire.

In FIG. 1, reference numeral 1 designates a tire, 2 its crown, 3 a shoulder portion, 4 a side portion and 5 a bead portion. The profile or shape $f$ of the tire when it is disposed in the metal mold is shown by a full line and the profile $f'$ of the tire after the inside thereof has been pressurized is shown by dotted lines. In the present example, the distance between the outside surfaces of the bases of the two bead portions 5, 5 is determined as 70% of the maximum tire sectional width.

Reference numeral 6 designates a carcass arranged in radial direction and 7 a breaker composed of laminated sheets of which cords are disposed to form a relatively small cord angle with the peripheral center lines $c$—$c$ of the tire. For the sake of convenience, the profile of the carcass 6 and the breaker 7 are shown in correspondence with those of the tire when it is disposed in the metal mold.

In radial tires, tension members acting in the peripheral direction of the tire as a skeleton on portions other than the bead portions are constituted by the breaker 7 only.

As a result, in the above mentioned metal mold design, by pressurizing the inside of the tire, the strongest burden is subjected to each end of the breaker 7, so that the utmost growth in shape occurs at each end of the breaker 7.

In FIG. 1, such amount of growth in shape at the center of the crown 2 is shown by $dc$ and at the crown end $e$ is shown by $de$. As seen from FIG. 1, $de$ is remarkably larger than $dc$.

On the other hand, in order to constitute the breaker by a laminated sheet consisting of several cord fabrics, the cords of each cord fabric layer sandwiched between thin rubber sheets are required to be disposed along different directions crossed with the peripheral center line $c$—$c$ of the tire.

If the breaker constructed as above described is subjected to tension in peripheral direction after the inside of the tire has been pressurized, the cords of each layer are apt to be aligned in the tension direction. As a result, the cord angles with the peripheral center line $c$—$c$ of the tire become small. This tendency is particularly intense at each end of the breaker 7 and followed by an enlargement of the distance between the cords. This causes the rubber layer sandwiched between the breaker cord layers to be subjected to the shearing strain mainly in peripheral direction. This shearing strain has a tendency to be increased from the center portion of the breaker to each end thereof.

In FIG. 2 is shown a graph illustrating a relation between an interlayer shearing strain of a breaker in the peripheral direction of a radial tire after the inside thereof has been pressurized and a breaker width. As seen from FIG. 2, the shearing strain changes from the center portion of the breaker toward each end thereof and changes near each end of the breaker in the form of a cubic curve and becomes the most intense at each end of the breaker.

As shown in FIG. 1, the apparent dimensions in shape of the above mentioned kind of the tire change from the profile $f$ of the tire when it is disposed in the vulcanizing metal mold to the profile $f'$ of the tire after the inside thereof has been pressurized. In this case, a relation between the growth $dc$ at the center crown portion and the growth $de$ at the crown end of the tire after the inside thereof has been pressurized is given by $$dc << de.$$

As a result, a radius of curvature $R_1$ of the outer profile of the carcass 6 in the vertical center section through the rotational axis of the tire and on the normal line V-V' thereto at the crown end $e$ near the breaker 7 tends to become smaller after the inside of the tire has been pressurized than the corresponding radius of curvature when the tire is disposed in the metal mold.

On the contrary, a radius of curvature $R_2$ of the outer surface of the crown 2 or that outer surface of the carcass which is located at the crown 2 becomes larger after the inside of the tire has been pressurized than the corresponding radius of curvature when the tire is disposed in the metal mold. In this manner, the profile $f$ of the tire is balanced in shape with the profile $f'$ of the tire. In addition, the maximum width of the tire becomes slightly increased after the inside of the tire has been pressurized, but this amount of increase is not so large.

On the other hand, the shearing strain shown in FIG. 2 is further increased when the tire is subjected to the load. Experimental tests have yielded the result that the shearing strain is increased by about 2 times larger when a normal amount of static load is subjected to that surface of the tire which makes contact with the ground. In addition, when the tire runs on the ground, the tire is subjected to a dynamic load which is several times larger than the above mentioned load. Particularly, each end of the breaker is exposed to unexpectedly severe conditions every time the tire is rotated and the breaker end passes that surface of the tire which makes contact with the ground.

As stated hereinbefore, the worst defect of the radial tire is that the breaker interlayer shearing strain produced at the breaker end is converted into heat when the tire is rotated under loaded condition, and that fatigue due to this heat together with mechanical fatigue cause a separation between the cords and the rubber surrounding the cords which separation is developed into a so-called separation fault at each end of the breaker in the course of the wear life of the tire.

In order to overcome such defects, many attempts have been made by locally adding a reinforcing layer to portions around each end of the breaker or by changing the breaker cord angles or by adding rubber having a good anti-fatigue property, but hitherto none has led to fully satisfactory results by means of the conventional method of designing the metal mold which can obtain the tire shape shown in FIG. 1.

The inventors have found out by their experiments that an increased amount of the shearing strain caused by the load subjected to the tire depends upon an initial shearing strain produced after the inside of the tire has been pressurized, and that by reducing this initial shearing strain to a small value, it is possible to significantly reduce the strain caused by the load.

The inventors have found out that by defining the modulus of the breaker cords and the angular arrangement of the breaker cords within a given range and by designing the metal mold such that the maximum width of the tire when it is disposed in the metal mold is far smaller than that of the tire after the inside thereof has been pressurized, the curvature of that portion of the carcass line which corresponds to each end of the breaker and the shape of that portion of the crown which is adjacent to the above carcass portion may be deformed into usable shapes, respectively, thereby remarkably reducing the breaker interlayer shearing strain at each end of the breaker of the tire after the inside thereof has been pressurized.

The shape of the tire cured in the metal mold is deformed when the tire removed from the metal mold is horizontally superimposed one upon the other or is deformed by any other exterior force subjected to the tire in the case of stocking the tires. But, if the tire removed from the metal mold is not subjected to such external forces, that shape of the tire which is defined by the metal mold is maintained after the tire has been removed from the metal mold. On the basis of such tire shape, the degree of deformation of the tire after the inside thereof has been pressurized is defined so as to reduce the above mentioned breaker interlayer shearing strain.

An object of the invention, therefore, is to provide a pneumatic radial tire so constructed as to reduce a breaker interlayer shearing strain without adding any particular supplemental reinforcing layer.

A feature of the invention is the provision of a pneumatic radial tire so constructed as to reduce a breaker interlayer shearing strain, comprising a pair of bead portions, a side portion arranged adjacent to each bead portion, an outwardly convex crown having shoulder portions connected to respective side portions, a carcass composed of at least one cord layer extending across said two bead portions and aligned in a radial direction or slightly inclined with the radial direction, and a breaker disposed outside said carcass and coextensive with said crown, said radial tire having an initial sectional shape which satisfies the following conditions:

1. $R_1/R_1' \leqq 0.8$,
2. $R_2/W/R_2'/W' \geqq 1.5$,
3. Modulus of a breaker cord $\geqq 10 \times 10^3$ Kg/mm$^2$, and
4. Breaker cord angle $\leqq 25°$ where $R_1$ is a radius of curvature of the outer profile of the carcass in a vertical center section through the rotational axis of the tire on a normal line to the outer curved surface through a widthwise end of said crown before the inside of the tire is pressurized, $R_1'$ is its corresponding radius of curvature after the inside of the tire has been pressurized, $R_2$ is a radius of curvature of the outer profile of the crown in the vertical center section through the rotational axis of the tire before the inside of the tire is pressurized, $R_2'$ is its corresponding radius of curvature after the inside of the tire has been pressurized, W is the maximum width of the tire in the vertical center section through the rotational axis of the tire before the inside of the tire is pressurized, and W' is its corresponding maximum width of the tire after the inside of the tire has been pressurized.

The invention will now be described in greater detail with reference to the accompanying drawings, wherein.

Figure 7:
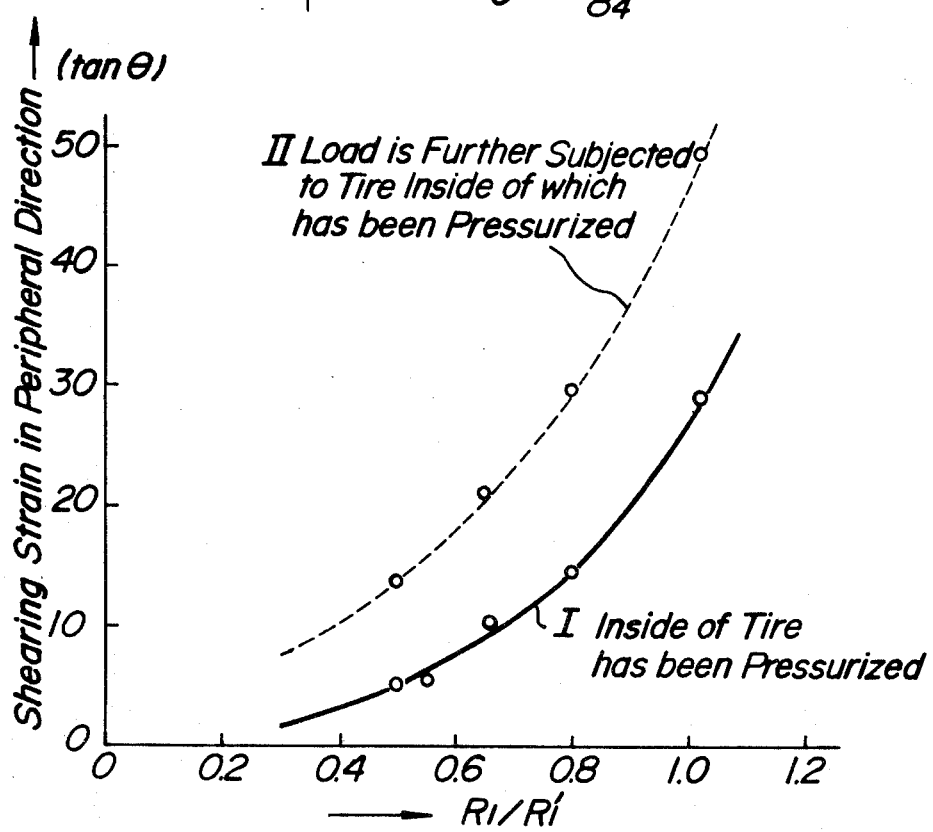

FIG. 7 is a graph illustrating a relation between a shearing strain in the peripheral direction of a radial tire according to the invention and a ratio of radii of curvature $R_1/R_1'$; and FIG. 8 is a graph illustrating measured result of the displacements in the peripheral direction of the breaker plies of the conventional radial tire and the radial tire according to the invention with respect to the breaker width.

As to the sectional shape of the tire according to the invention, it is a matter of course that the distance between the two beads must be the same as that of the tire when it is disposed in the metal mold before and after the inside of the tire has been pressurized. In addition, the maximum width of the tire shall be understood to mean the dimension in a direction of the rotational axis of the tire exclusive of projections for forming letters and decorations for the outer surface of the side portion of the tire.

Figure 3:
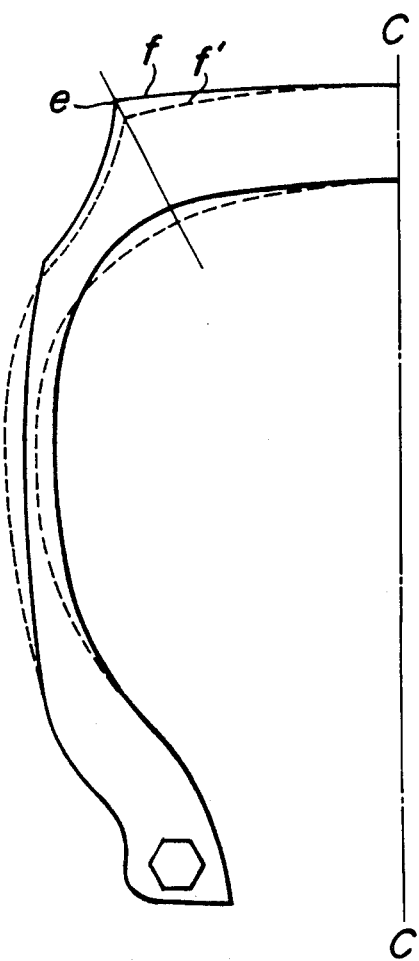
FIG. 3 is a schematic sectional view of a left half of a radial tire according to the invention showing change in shape of the tire when it is disposed in a vulcanizing metal mold by a full line and after the inside thereof has been pressurized by dotted lines.

In FIG. 3 is shown the profile of the tire in a vertical center section through the rotational axis of the tire before the inside thereof is pressurized by a full line compared with the corresponding profile of the tire after the inside thereof has been pressurized by dotted lines. In this case, a distance between the outer surfaces of respective bead base portions is fixed to 70% of the maximum width of the tire after the inside thereof has been pressurized.

As seen from FIG. 3, the profile $f$ of the tire after the inside thereof has been pressurized has an increased radius of curvature of the outer curved surface of the carcass on the normal line thereto through the crown end $e$ in the vertical center section through the rotational axis of the tire if compared with the profile $f$ of the tire before the inside thereof is pressurized, while the profile $f'$ of the tire after the inside thereof has been pressurized has a decreased radius of curvature of the outer surface of the crown in the vertical center section through the rotational axis of the tire if compared with the profile $f$ of the tire before the inside thereof is pressurized. As seen from FIG. 3, such deformation is effected by a remarkable increase of the tire width.

Figure 4:
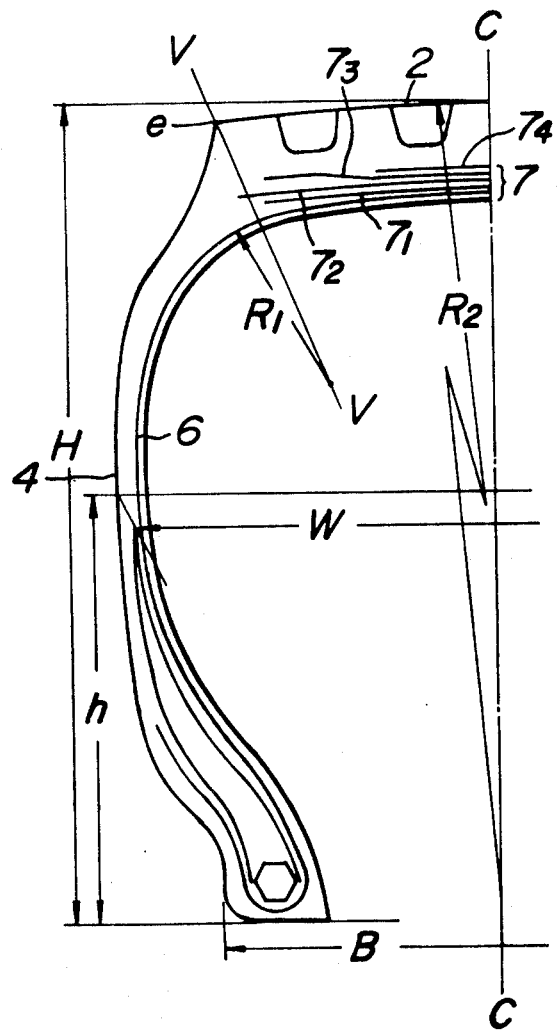
FIG. 4 is a schematic sectional view of a left half of the radial tire according to the invention showing a shape of the tire in greater detail when it is disposed in the vulcanizing metal mold.
Figure 5:
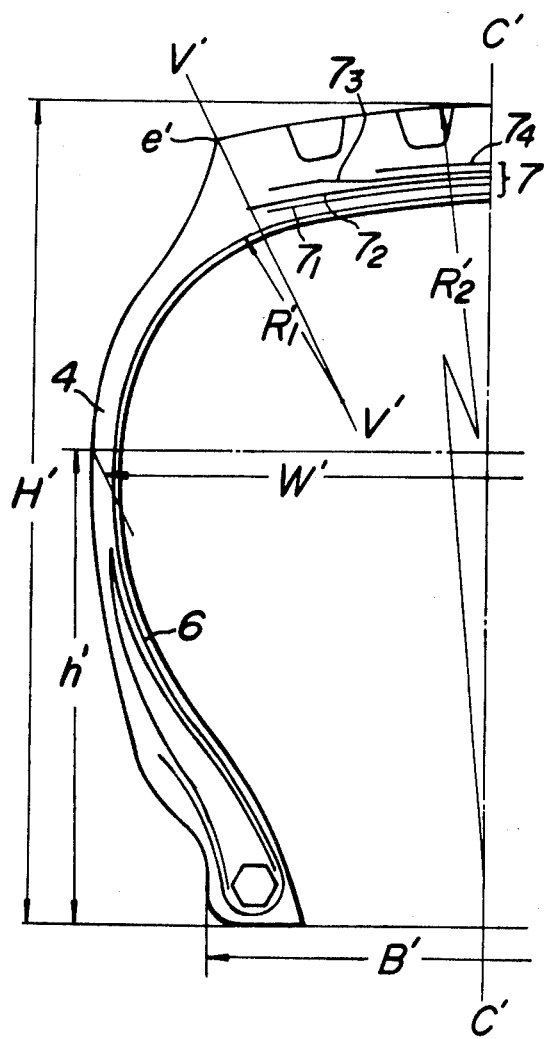
FIG. 5 shows the same detail as FIG. 4 after the inside of the tire has been pressurized.

FIGS. 4 and 5 illustrate in greater detail the sectional shape of the tire according to the invention together with the internal construction thereof. FIG. 4 is the vertical center section of the tire through the rotational axis thereof when the tire is disposed in the metal mold, while FIG. 5 is the vertical center section of the tire through the rotational axis thereof after the inside of the tire has been pressurized.

Figure 6:
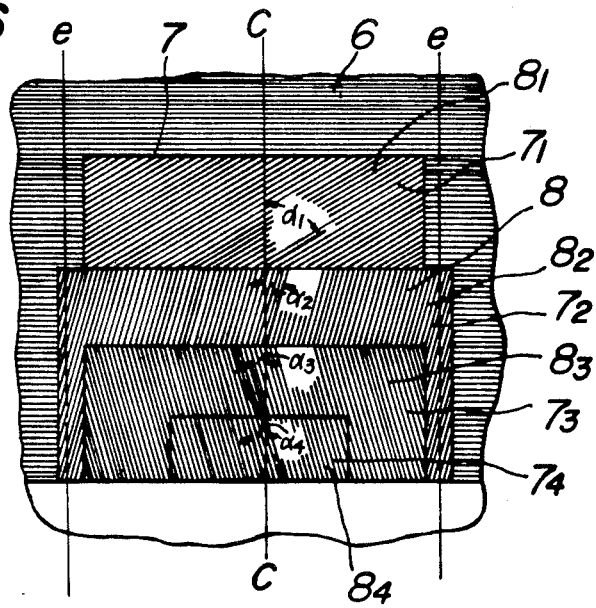
FIG. 6 is a plan view of cords arranged in a carcass and a breaker according to the invention.

FIG. 6 is a plan view of a breaker arranged in the crown portion of the tire according to the invention.

The essentials of the invention consist in that the inside of the radial tire is pressurized so as to change its initial shape, and that the shearing strain at each end of the breaker 7 is significantly reduced under the balanced condition of the shape of the tire after the inside thereof has been pressurized.

In order to obtain such result, it is necessary to make the radius of curvature $R_1$ of the outer curved surface on the normal line thereto at the crown end $e$ in the vertical center section through the rotational axis of the tire before the inside thereof is pressurized small with respect to the corresponding radius of curvature $R_1'$ after the inside has been pressurized. That is, a ratio of $R_1/R_1'$ must be not greater than 0.8.

In FIG. 7 is shown a relation between the above mentioned ratio of radii of curvatures $R_1/R_1'$ and the shearing strain in the peripheral direction, which relation being obtained by the result yielded by experimental tests on tire size end breaker construction to be described later.

In FIG. 7, $R_1/R_1'$ is plotted on the abscissa, while the shearing strain $\tan \theta$ defined by the amount of displacement in the peripheral direction of the tire between the breaker plies $7_2$ and $7_3$ shown in FIG. 6 is plotted on the ordinate. The shearing strain was measured at that position of the breaker which is located at the end of the ply $7_3$ in its widthwise direction.

In FIG. 7, a full line curve I represents the amount of strain of the tire when the inside thereof has been pressurized, while a dotted line curve II represents the amount of strain when load is further subjected to the tire inside of which has been pressurized.

As seen from these curves I, II, it is preferable to determine $R_1/R_1'$ at most 0.8 and more preferable at most 0.6. It is noted that the distance between the two curves I and II becomes narrower as the value of $R_1/R_1'$ becomes smaller. Let the flatness defined by a ratio of the radius of curvature $R_2'$ of the outer surface of the crown 2 to the tire width W', that is, $R_2'/W'$ after the inside of the tire has been pressurized be F' and let the flatness defined by a ratio of the radius of curvature $R_2$ of the outer surface of the crown 2 to the tire width W, that is, $R_2/W$ before the inside of the tire is pressurized be F, then it is preferable to make a ratio F/F' at least 1.5 and more preferably at least 2.0 since F' must be made large in order to balance the shape of the tire.

In order to advantageously obtain such deformation of the tire which satisfies the conditions $R_1/R_1' \leq 0.8$ and
$F/F' \geq 1.5$, it is preferable to determine the initial shape of the tire defined by the vulcanizing metal mold such that the curvature particularly at the side portion of the tire is made as small as possible with respect to the tire shape when the inside of the tire has been pressurized contrary in design to the conventional tire, and determine a ratio of the maximum widths W/W' of the tire before and after the inside of the tire has been pressurized within a range from 0.90 to 0.98.

The inventors have found out that in order to effectively reduce the shearing strain at each end of the breaker during running of the tire by keeping in balance the deformation of the above mentioned initial shape of the tire occurred when the inside thereof has been pressurized, the modulus and the cord angles of the cords $8_2$ and $8_3$ arranged in the breaker 7 are particularly important.

That is, the modulus of the cords $8_2$, $8_3$ be at least $10 \times 10^3$ Kg/mm², preferably be at least $13 \times 10^3$ Kg/mm². In addition, it is necessary to use a breaker 7 including a periphery directed tension member which consists of at least two rubberized cords laminated sheet, for example two plies $7_2$ and $7_3$, said rubberized cords being oppositely inclined with each other and inclined with the peripheral center line $c-c$ of the tire by at most 25° (these cord angles correspond to $\alpha_2$ and $\alpha_3$ in FIG. 6, respectively).

The term the modulus of the cord shall be understood to mean a value given by $a/(b/100 \times S)$ where $a$ is a tension in Kg subjected to the cord within a proportional limit (an elastic limit), $b$ is an elongation of the cord in % and S is a sectional area of the cord in mm².

In the above described construction, each end of the breaker 7 is substantially arranged along arcs having a center on the above mentioned normal line. As a result, when the tire shape shown in FIG. 4 is deformed into the tire shape shown in FIG. 5, the tire width W becomes considerably increased and the radius of curvature of that portion of the crown 2 which lies near the center thereof becomes decreased owing to a slight expansion of the above crown portion.

On the other hand, the tightening of the cords due to the action of the inside pressure of the tire is effectively distributed toward each end of the breaker, so that the sectional shape of the tire around the normal line V'—V' becomes changed into a balanced condition. As a result, the squeezing effect subjected to each end of the breaker, that is, a tendency of reducing the diameter of the tire at each end of the breaker 7 results in a difficulty of producing the interlayer shearing strain of the breaker. The above mentioned squeezing effect or reduction in diameter of the tire at each end of the breaker results in a reduction in diameter of the tire at the crown end e shown in FIG. 3.

The radius of curvature $R_1$ shown in FIG. 4 is considerably small if compared with that of the conventional tire. On the contrary, the radius of curvature $R_2$ of the crown portion is remarkably large if compared with that of the conventional tire, that is, the radius of curvature of the breaker in vertical center section through the rotational axis of the tire. Such small $R_1$ and large $R_2$ are accompanied by a significant decrease of the thickness of the tire portion in the normal line V—V direction. As a result, it is possible to effectively prevent radiation of heat produced by rotation of the tire during its running.

As to the radius of curvature $R_2$, when the tire is subjected to the load, $R_2'$ shown in FIG. 5 is restored to $R_2$ shown in FIG. 4 in which the ground contact surface of the tire is substantially the same in shape as the flat ground surface. As a result, it is possible to considerably suppress an increase of the shearing strain from its initial strain. However, it is restricted to make the ratio of the radii of curvature $R_1/R_1'$ indefinitely small from a standpoint of manufacturing tires. The lower limit of the ratio $R_1/R_1'$ is suitably selected by the kind, use and the type of the tires. The ratio of the flatness is similarly determined.

On the contrary, if use is made of a cord acting as the tension member and having a modulus at most $10 \times 10^3$ Kg/mm$^2$ or if the cord angle of the breaker with the vertical center section through the rotational axis of the tire is made at least 25°, it is impossible to obtain the desired result.

Particularly, if the modulus of the cord is too small, application of the internal pressure to the tire results in a local deformation of the breaker under a balanced condition, so that it is impossible to reduce the shearing strain in the peripheral direction of the tire at each end of the breaker.

The tire shaped and constructed as above described in accordance with the invention will now be compared with the conventional tire with respect to the shearing strain in the peripheral direction of the tire at each end of the breaker with reference to the following example.

A tire size is selected as 10.00R20 14PR. The shape and construction according to the invention are defined as shown in FIGS. 4, 5 and 6. That is, a carcass 6 is of a radial construction and formed by one rubberized sheet, the steel cords of which are inclined at an angle of 90° with respect to the peripheral center line c—c of the tire.

A breaker 7 is formed by four plies $7_1$ to $7_4$. The ply $7_2$ second counted from the carcass 6 is the widest in width and completely covers a crown 2. Plies $7_1$ and $7_3$ have substantially the same width and are narrower in width than the ply $7_2$. The uppermost ply $7_4$ is the narrowest in width and is about ½ times smaller than the width of the crown 2. A breaker cord 8 in each ply is composed of a core constituted by twisting together three steel filaments each having a diameter of 0.20 mm and six steel filaments each having a diameter of 0.38 mm and spirally wound around the core. That is, the breaker cord 8 is of a steel cord having a so-called $1 \times 3 \times 0.20 + 6 \times 0.38$ construction and has a modulus of $14 \times 10^3$ Kg/mm$^2$.

The cords 8 extend in two directions inclined at angles of $\alpha_1 = 65°$, $\alpha_2 = 20°$, $\alpha_3 = 20°$ and $\alpha_4 = 20°$ with respect to the peripheral center line c—c of the tire. The cords 8 cross each other between the breaker plies $7_1$ and $7_2$ on the one hand and $7_3$ and $7_4$ on the other hand.

The radius of the curvature $R_1'$ of the outer surface of the carcass at a position of the normal line V'—V' through the crown end e' when an internal pressure of 7.25 Kg/cm$^2$ is applied to the inside of the tire is 90 mm, the corresponding radius of curvature $R_1$ when the tire is disposed in a vulcanizing metal mold is 50 mm, and the ratio $R_1/R_1'$ is 0.55.

The radius of curvature $R_2'$ of the crown outer surface at the crown center portion and the maximum width W' of the tire after the inside of the tire has been pressurized are 460 mm and 271 mm, respectively. The flatness F' defined by the ratio $R_2'/W'$ is 1.7. The corresponding $R_2$ and W when the tire is disposed in the metal mold are 1350 mm and 275 mm, respectively, and the corresponding flatness F is 4.9. The ratio F/F' of the flatnesses is 2.9. Of course, in this case the distance B between the two beads of the tire when it is disposed in the metal mold is substantially equal to the distance B' between the two beads of the tire after the inside thereof has been pressurized and is 190 mm (7.5 inches).

Let H' be a height of a tire section represented by a distance between the inner periphery of the bead of the tire and the top of the crown in a vertical center section through the rotational axis of the tire after the inside thereof has been pressurized as shown in FIG. 5 and let H be the corresponding height of the tire when it is disposed in the metal mold as shown in FIG. 4. Then, H' is 271 mm and H is 270 mm. On the one hand, let h' be a height from the inner peripheral base of the bead of the tire to the maximum width position of the tire in the same vertical center section when the inside of the tire has been pressurized and let h be the corresponding height when the tire is disposed in the metal mold. Then h' is 153 mm and h is 143 mm. As a result, $(h'/H') = 0.56$ and $(h/H) = 0.53$. As seen from such relations, the heights h and h' from the inner periphery of the bead of the tire to the tire maximum width position before and after the inside of the tire has been pressurized are not very much displaced, so that the tire maximum width position always lies at the center region of the sectional height.

Figure 1:
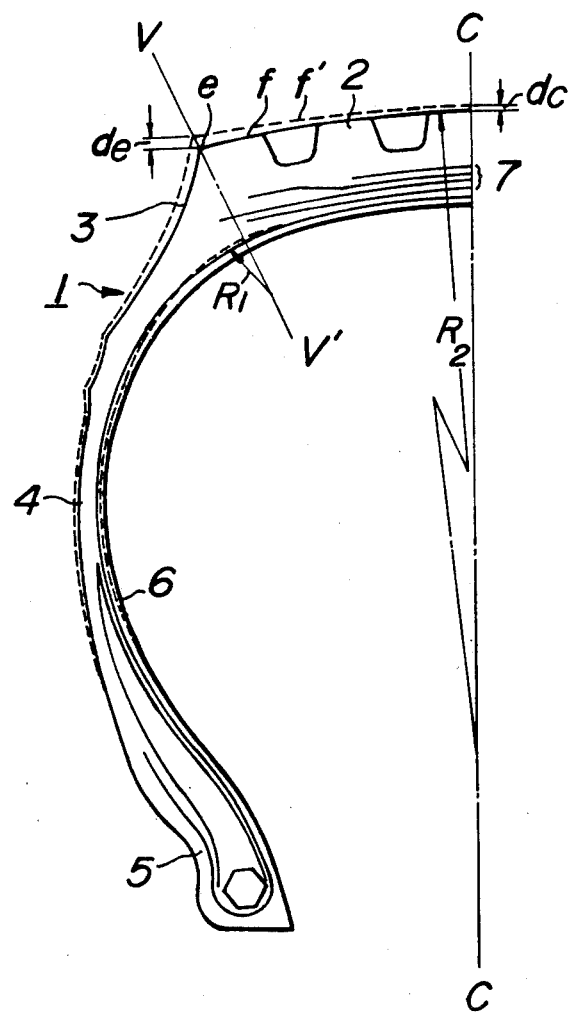
FIG. 1 is a schematic sectional view of a left half of a conventional radial tire showing change in shape of the tire when it is disposed in a vulcanizing metal mold by a full line and after the inside thereof has been pressurized by dotted lines.
Figure 2:
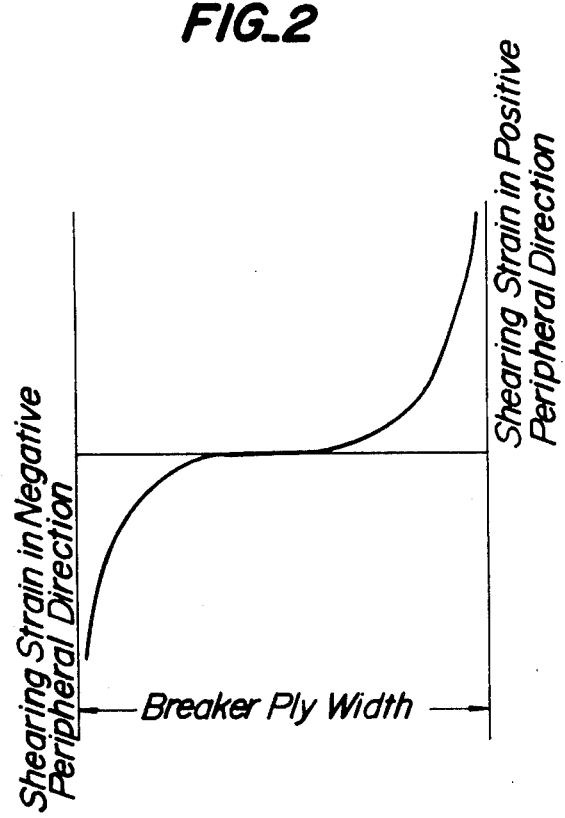
FIG. 2 is a graph illustrating a relation between an interlayer shearing strain of a breaker in the peripheral direction of a radial tire after the inside thereof has been pressurized and a breaker width.

Now, let it be assumed that the conventional tire has a shape shown in FIG. 1 makes use of tire breaker construction shown in FIG. 6 for the sake of convenience.

Both the above mentioned kind of tire according to the invention and the conventional tire were mounted on wheel rims of 7.50 V, respectively. Then, the displacements in the peripheral direction of the cords between the breaker plies $7_2$ and $7_3$ shown in FIG. 6 occurred after the insides of these tires have been pressurized by an internal pressure of 7.25 Kg/cm$^2$ were measured along the overall width of the breaker. The result thus obtained is shown in FIG. 8.

This displacement in the peripheral direction between the breaker plies correspond to the shearing strain in the peripheral direction.

In FIG. 8, a full line curve III shows the displacement in peripheral direction of the cords of the conventional tire. As seen from the curve III, the displacement in peripheral direction of the cords of the conventional tire increases from the center position of the breaker width toward each end of the breaker width along a cubic curve.

A dotted line curve IV shows the displacement in peripheral direction of the cords of the tire according to the invention. As seen from the curve IV, the displacement in peripheral direction of the cords of the tire according to the invention is substantially the same as that of the conventional tire at the central region of the breaker width, but becomes peak at a position spaced apart from the center position of the breaker width and then decreases toward each end of the breaker width.

As seen from FIG. 8, the displacement in peripheral direction at each end of the breaker of the tire according to the invention is about ¼ times smaller than that of the conventional tire.

The values of the displacements in the peripheral direction at each end of the breaker shown by the curves III and IV in FIG. 8 correspond to the values of the shearing strains given by the curve I in FIG. 7 when $R_1/R_1' = 1.02$ and $R_1/R_1' = 0.55$, respectively.

It should be noted that the use of rayon cord and the like having a small modulus of the order of $20 \times 10^2$ Kg/mm$^2$ involves not only a difficulty in obtaining the desired results, but also an occurrence of cord creep with the lapse of time after the inside of the tire has been pressurized thereby increasing the shearing strain at each end of the breaker. Thus, it is not preferable to use the above mentioned kind of rayon cord and the like.

As explained hereinbefore, the radial tire according to the invention makes use of an internal pressure applied to the inside of the tire so as to obtain a balanced shape at each end of the breaker, and thereby significantly reduces separation fault which is inherent to the radial tire and apt to occur during running of the tire without adding any particular supplemental reinforcing layer.

What is claimed is:

1. A pneumatic radial tire constructed to reduce breaker interlayer shearing strain, comprising: a pair of bead portions; a side portion arranged adjacent to each bead portion; an outwardly convex crown having shoulder portions connected to respective side portions, a carcass composed of at least one inextensible cord layer extending across said two bead portions and aligned in a substantially radial direction of the tire, and a breaker disposed outside said carcass in said crown and having a width substantially equal to a width of said crown, said breaker comprising at least two layers of cords having a modulus of at least $10 \times 10^3$ kg/mm$^2$, said breaker cords being inclined a maximum of 25° with respect to the peripheral center line of the tire in different directions between said layers, said tire having an initial sectional shape which satisfies the following conditions when spaces between said bead portions are held in a normal distance before and after pressurizing said tire:

1. $R_1/R_1' \leq 0.8$,
2. $R_2/W/R_2'/W' \geq 1.5$, where $R_1$ is a radius of curvature of the outer profile of the carcass in a vertical center section through the rotational axis of the tire on a normal line to the outer curved surface through a width-wise end of said crown before the inside of the tire is pressurized, $R_1'$ is its corresponding radius of curvature after the inside of the tire has normally been pressurized, $R_2$ is a radius of curvature of the outer profile of the crown in the vertical center section through the rotational axis of the tire before the inside of the tire is pressurized, $R_2'$ is its corresponding radius of curvature after the inside of the tire has normally been pressurized, W is the maximum width of the tire in the vertical center section through the rotational axis of the tire before the inside of the tire is pressurized, and W' is its corresponding maximum width of the tire after the inside of the tire has normally been pressurized.

2. A pneumatic radial tire as claimed in claim 1, wherein said $R_1/R_1'$ is at most 0.6.

3. A pneumatic radial tire as claimed in claim 1, wherein said $R_2/W/R_2'/W'$ is at least 2.0.

4. A pneumatic radial tire as claimed in claim 1, wherein the diameter of the tire at each end of the crown when the internal pressure is not applied to the tire is reduced after the inside of the tire has been pressurized.

5. A pneumatic radial tire as claimed in claim 1, wherein said W/W' changes within a range from 0.90 to 0.98.

6. A pneumatic radial tire as claimed in claim 1, wherein said modulus of said breaker cord is at least $13 \times 10^3$ Kg/mm$^2$.

7. A pneumatic radial tire as claimed in claim 1, wherein said breaker makes use of a metallic cord as a reinforcing material.

8. A pneumatic radial tire as claimed in claim 7, wherein said carcass makes use of one metallic cord layer as a cord layer.

9. A pneumatic radial tire as claimed in claim 7, wherein said reinforcing material of said breaker is a steel cord layer composed of three laminated plies.

10. A pneumatic radial tire as claimed in claim 7, wherein said reinforcing material of said breaker is a steel cord layer composed of four laminated plies.

11. A pneumatic radial tire as claimed in claim 10, wherein said cords in each of said four steel cord layers extend in two directions and inclined at angles of about 65°, 20°, 20° and 20° with respect to the peripheral center line of the tire in the order from the layer adjacent to said carcass, respectively, the layer farthermost from said carcass being the narrowest in width.

12. A pneumatic radial tire as claimed in claim 7, wherein said $R_1/R_1'$ is about 0.55 and said $R_2/W/R_2'/W'$ is about 2.9.

13. A pneumatic radial tire as claimed in claim 7, wherein a ratio of a height from the inner peripheral base of the bead of the tire to the maximum width position of the tire in a vertical center section through the rotational axis of the tire to a height from the inner peripheral base of the bead of the tire to the top of the crown in the same vertical center section is substantially constant before and after the inside of the tire has been pressurized.

* * * * *